United States Patent
Sherman

(10) Patent No.: US 8,279,821 B2
(45) Date of Patent: Oct. 2, 2012

(54) ASSIGNING CHANNELS TO USERS IN WIRELESS NETWORKS THAT INCORPORATE MULTI-USER DETECTION (MUD)

(75) Inventor: Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 501 days.

(21) Appl. No.: 12/668,090

(22) PCT Filed: Apr. 21, 2009

(86) PCT No.: PCT/US2009/002471
§ 371 (c)(1),
(2), (4) Date: Jan. 7, 2010

(87) PCT Pub. No.: WO2009/131662
PCT Pub. Date: Oct. 29, 2009

(65) Prior Publication Data
US 2011/0013570 A1    Jan. 20, 2011

Related U.S. Application Data

(60) Provisional application No. 61/125,157, filed on Apr. 23, 2008.

(51) Int. Cl.
*H04W 4/00* (2009.01)
*H04L 12/18* (2006.01)
*H04J 3/16* (2006.01)
*H04B 7/00* (2006.01)

(52) U.S. Cl. ......... 370/329; 455/522; 370/431; 370/437

(58) Field of Classification Search .................. 370/317, 370/318, 431, 437, 329–338, 252; 455/522
See application file for complete search history.

(56) References Cited

U.S. PATENT DOCUMENTS

| | | | |
|---|---|---|---|
| 7,092,452 B2 * | 8/2006 | Taylor et al. ................... | 375/267 |
| 7,158,792 B1 * | 1/2007 | Cook et al. ..................... | 455/450 |
| 8,107,425 B2 * | 1/2012 | de Bruin et al. ............. | 370/329 |
| 8,179,835 B2 * | 5/2012 | Zhang et al. ................... | 370/321 |
| 2003/0027578 A1 * | 2/2003 | Zeira et al. ..................... | 455/452 |
| 2004/0102202 A1 * | 5/2004 | Kumaran et al. ............. | 455/515 |

* cited by examiner

*Primary Examiner* — Ian N Moore
*Assistant Examiner* — Afshawn Towfighi
(74) *Attorney, Agent, or Firm* — Daniel J. Long; Leo Zucker

(57) ABSTRACT

Statistics are collected for each network user, including signal bandwidth (BW), required receive power (RRP) for decoding a user signal, and available transmit margin (ATM). Users are ordered by BW from greatest to smallest. Users with a greatest BW are then ordered by ATM from lowest to highest, and divided into lower half users having lower ATMs, and upper half users having higher ATMs. A two-tier channel plan is defined, and lower half users are assigned to channels in a lower tier. An upper half user is assigned a channel in an upper tier after placing a lower half user in the same channel in the lower tier, if the upper half user's ATM is >(U User RRP+L User RRP). Otherwise, the user is assigned a different channel in the lower tier. The dividing and subsequent steps repeat for any remaining sets of users requiring successively smaller signal bandwidths.

8 Claims, 9 Drawing Sheets

| User | BW | RRP | ATM |
|------|----|----|-----|
| 4 | 2 | 6 | 7 |
| 5 | 2 | 8 | 8 |
| 6 | 2 | 8 | 15 |
| 2 | 2 | 6 | 13 |
| 3 | 1 | 4 | 10 |
| 1 | 1 | 4 | 4 |

Final Statistics

Statistics could change if BW / RRP had changed above

No Change

FIG. 9

ASSIGNING CHANNELS TO USERS IN WIRELESS NETWORKS THAT INCORPORATE MULTI-USER DETECTION (MUD)

CROSS REFERENCE TO RELATED APPLICATION

This application claims priority under 35 U.S.C. §119(e) of U.S. Provisional Patent Application No. 61/125,157 filed Apr. 23, 2008, entitled Channel Assignment Scheme for MUD and incorporated by reference in its entirety.

BACKGROUND OF THE INVENTION

1. Field of the Invention

The present invention relates to wireless communication networks, and particularly to a method of assigning channels or bandwidth to multiple network users.

2. Discussion of the Known Art

Wireless communication networks having so-called multi-user detection or AMUD≅ capability, are generally known. In such networks, for example, two users may be assigned a common frequency channel on which to transmit voice, data or other information signals. Interference at a given receiver caused by the stronger one of the two user signals on the channel, can be canceled using known successive interference cancellation (SIC) or other techniques so that the data transmitted by the weaker user may also be detected and decoded. See, e.g, U.S. Pat. No. 6,404,760 (Jun. 11, 2002), which discloses a method of reducing multiple access interference in CDMA systems wherein a weighted replica of a strongest interfering signal is derived from the received signal, and then subtracted from a delayed version of the received signal. See also, U.S. Pat. No. 6,564,037 (May 13, 2003) which relates to multi-user detection in CDMA systems having beam forming receiving antenna arrays, and U.S. Pat. No. 7,158,804 (Jan. 2, 2007) which discloses scheduling of uplink signals from a number of mobile users based on certain metrics determined for each user. All relevant portions of the mentioned '760, '037 and '804 U.S. patents are incorporated by reference.

U.S. Pat. No. 7,072,315 (Jul. 4, 2006), also incorporated by reference, discloses a medium access control (MAC) protocol for assigning traffic channels to subscribers in an orthogonal frequency division multiple access (OFDMA) cellular network. In one example, a base station in the network broadcasts an omni-directional downlink sounding signal having a data sequence that is previously made known to the subscribers. Based on the condition of the sounding signal as received by an active subscriber, the subscriber transmits measured channel and noise-plus-interference information signals to the base station when paged by the base station, or when the subscriber has traffic (e.g., data packets) ready to transmit. The base station estimates broadband spatial processing gains across all available sub-channels, and determines optimal sets of non-overlapping traffic sub-channels for use by each active subscriber in order to avoid interference.

SUMMARY OF THE INVENTION

According to the invention, a method of assigning bandwidth or channels to users in wireless networks that incorporate multi-user detection (MUD), includes collecting link statistics for a set of network users by associating with each user (i) a bandwidth (BW) of a signal from the user, (ii) a required receive power (RRP) for the signal to be decoded at a certain receiving terminal in the network, and (iii) an available transmit margin (ATM) corresponding to a maximum attainable receive power density for the signal with respect to noise at the receiving terminal.

A set of network users are ordered according to their associated signal BW requirements from greatest BW to least, and users having the greatest BW requirement are ordered according to their ATM from smallest ATM to highest. A first set of the users having the greatest BW are divided into a group of lower half users having relatively low ATM, and a group of upper half users having relatively high ATM with respect to the ATM of the lower half users. the lower half users are sorted according to RRP from least RRP to greatest. Head room for each user is defined as ATM minus RRP, and the upper half users are sorted according to head room from greatest head room to least.

A channel plan is defined with a number of network channels for assignment to the users, including a lower tier in the channel plan for placement of certain lower users (L User), and an upper tier for placement of certain upper users (U User). The lower half users are initially assigned to corresponding channels in the lower tier of the channel plan. An upper half user is assigned to a channel in the upper tier after a lower half user is placed in the lower tier and assigned bandwidth that extends in the same channel, only if the upper half user has an ATM that satisfies U User ATM>(U User RRP+L User RRP), wherein U User RRP is the RRP associated with the upper half user, and L User RRP is the RRP associated with the lower half user. If the ATM of the upper half user does not satisfy the relationship, the upper half user is assigned a different channel in the lower tier of the channel plan.

The dividing and subsequent steps are repeated for each, if any, remaining sets of users having successively smaller signal bandwidths relative to that of the first set of users, in order from most BW to least BW sets of users.

For a better understanding of the invention, reference is made to the following description taken in conjunction with the accompanying drawing and the appended claims.

BRIEF DESCRIPTION OF THE DRAWING

In the drawing:

FIG. 9 illustrates final link statistics for each user.

DETAILED DESCRIPTION OF THE INVENTION

Figure 1:
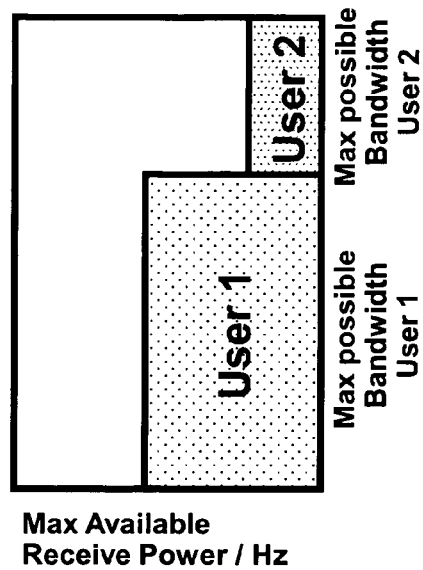
FIG. 1 illustrates a satellite communications (SATCOM) network, and differences in available transmit margin (ATM) among signals transmitted from multiple users at different locations and weather conditions.
Figure 1:
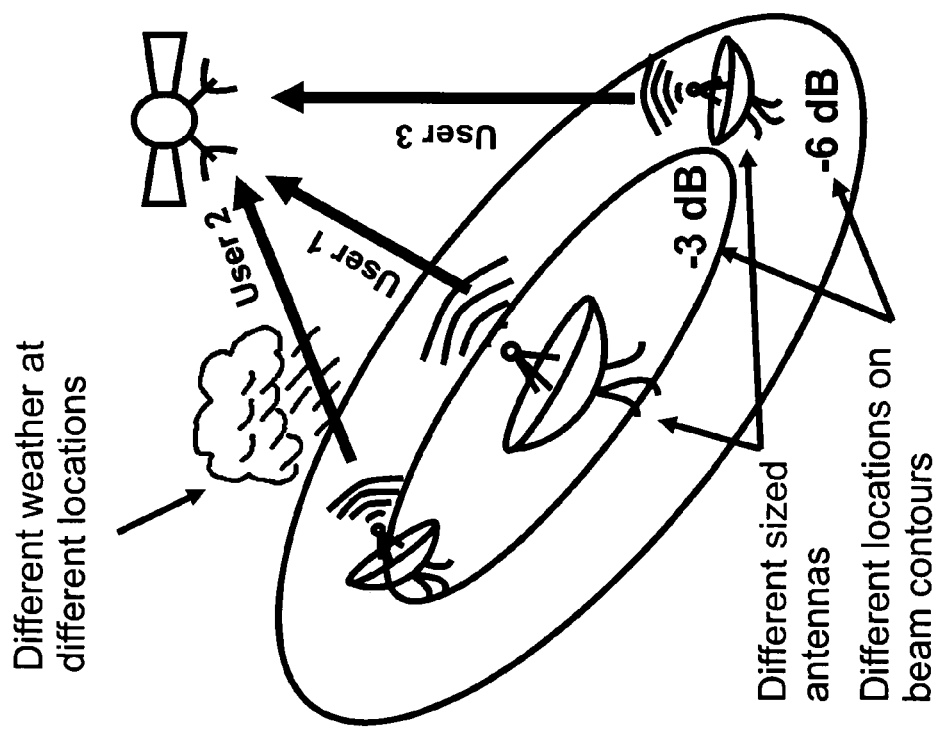

Under typical propagation conditions, when two wireless signals which occupy common frequency spectrum or bandwidth (referred to below as Aco-channel signals≅) arrive simultaneously at a given receiving terminal, one signal is typically advantaged (i.e., has more field strength) relative to the other signal, and the terminal may decode information from the one signal with few, if any, errors. In a satellite based communications network as shown in FIG. 1, local weather, different sized antennas, and/or different locations of network users with respect to antenna beam contours, often lead to differences in the available transmit margin (ATM) for each user. ATM is a measure of the most additional power available at a given user beyond that needed for the user to close a link, i.e., to enable communication from the user to the satellite with less than a predetermined number of errors.

Figure 2:
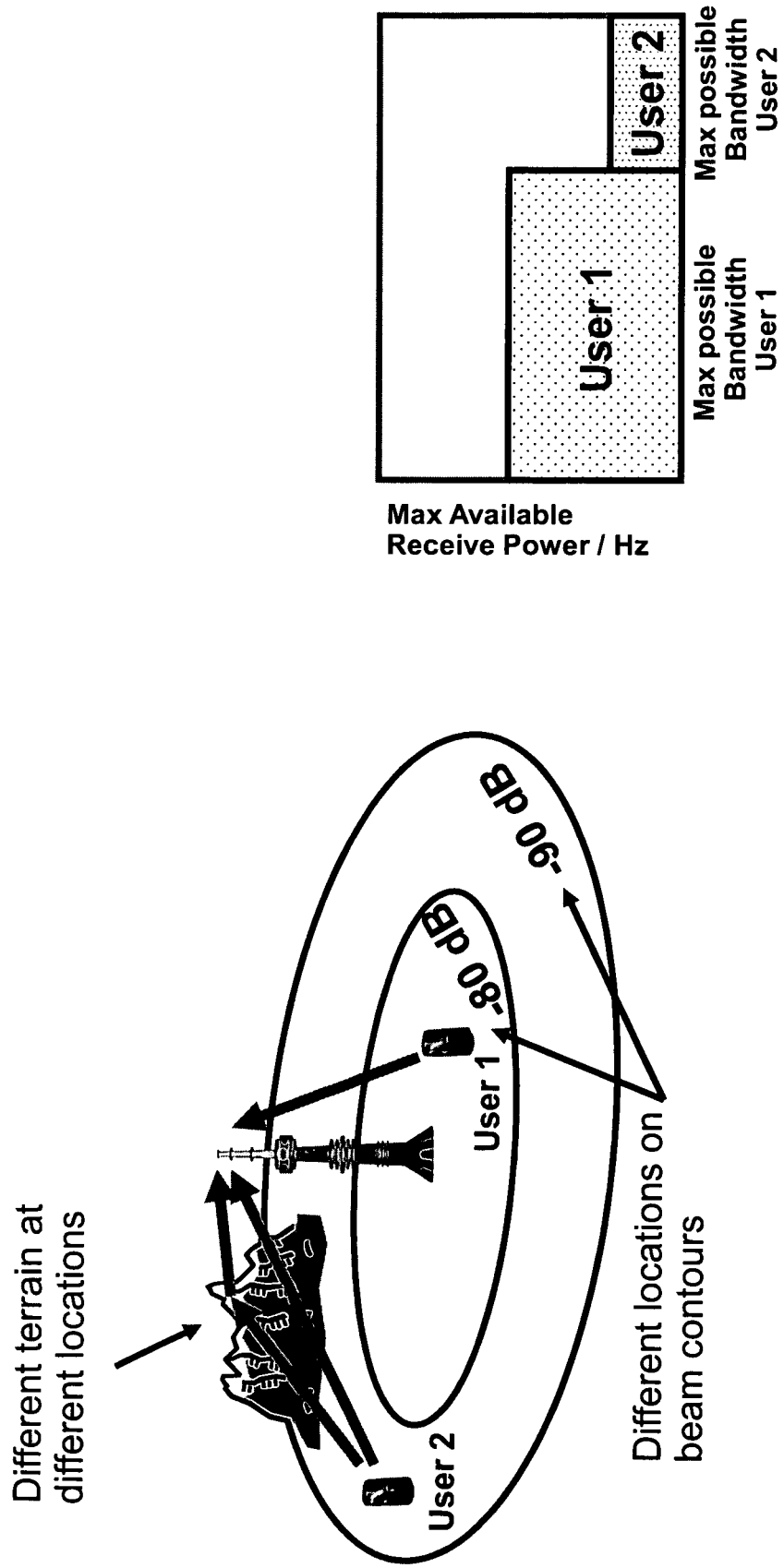
FIG. 2 illustrates a terrestrial cellular network, and differences in ATM among signals transmitted from multiple users at different locations and terrain.

In a cellular network as shown in FIG. 2, similar situations may exist where different weather conditions and antenna patterns cause one user, who is typically mobile, to be advantaged over another. Antenna beam contours play a similar role as they do for satellite networks, and terrain also impacts how advantaged one user is over another in cellular networks as well as in some satellite systems.

In a wireless communication system, links are established using two key network resources, namely, (i) user signal power, and (ii) user signal bandwidth or simply Abandwidth≅. The total capacity of a communication system depends on both of these resources. Often, only one of the resources is a constraining factor in a given situation, and it becomes possible to trade bandwidth for power, and vice versa, in order to maintain a closed link. Normally, trading between user signal power and bandwidth options is implemented by changes in modulation and error correction coding (coding). Power control and adaptive modulation/coding are typically used to optimize link performance. In certain situations, however, the most constrained users cannot opt for smaller bandwidth because they do not have the available power needed to maintain a narrower bandwidth link. Other users may have sufficient reserve power to transmit within a narrower bandwidth, but lack the signal processing capability needed to implement that option at their transmitter and/or their receiver. Note that it is often desirable to keep user equipment as simple as possible, so that the number of power, bandwidth, modulation, and coding options available at a given user may be limited. In the following description, the terms Aterminal≅ and Auser≅ are used interchangeably.

An alternative way to trade bandwidth for power is to employ multi-user detection (MUD) at terminal receivers. Most MUD techniques allow for a wide range of power level differences among a number of co-channel user signals. There are, however, many forms of MUD some of which are too complex to make them practical to implement in most network terminals. Particularly for an uplink to a spacecraft that processes (i.e., demodulates and decodes) user signals, less complex algorithms are desired. One relatively simple MUD technique is successive interference cancellation (SIC), mentioned above. To apply SIC properly, however, tighter power control must be implemented than in most other MUD systems. Nevertheless, because of its relative simplicity, methods that incorporate SIC are desirable, particularly in SATCOM systems wherein uplink signals transmitted from users are processed at the satellite platform. To apply a SIC based MUD in a SATCOM, cellular, and other communication system in which a number of users communicate with a common platform (e.g., satellite or land base station) by way of assigned channels, a process is needed for assigning the channels to users in such a way that available bandwidth and power are used optimally. The present invention defines such a method, and it may also be used with more complex MUD processes such as, e.g., Least Mean Square (LMS), Recursive Least Squares (RLS), and Maximum Likelihood Detection (MLD).

As mentioned, the task of a network scheduler or spectrum manager is to allocate power and bandwidth among each user in the network. The difficulty of the task is compounded in systems that practice MUD where it is possible for more than one user to be assigned common bandwidth at certain periods of time. In addition, constraints on allocating bandwidth can vary based on the type of MUD employed. For a simple SIC form of MUD, a signal received with the most power at a given terminal and on a given channel must have enough strength relative to lower power co-channel signals, so that a low-power signal does not negatively impact the decoding of the high power signal, and signal processing can then be used effectively to cancel the high power signal or Aupper user≅ from the received signal so that the low power signal or Alower user≅ can be decoded.

In the inventive technique, channels are assigned to network users based in part on a user=s available transmit margin (ATM) as a measure of its impairment. As used herein, ATM is defined as the difference between the maximum attainable power density (power/Hz in dB) for a given user=s signal bandwidth as received at, e.g., a base station or satellite, compared to the noise floor density (power/Hz in dB) at the station or satellite. Note that power backoffs required by a given user=s transmitter to implement different modulation and coding formats should also be considered when determining the maximum attainable power density for the user=s signal.

Figure 3:
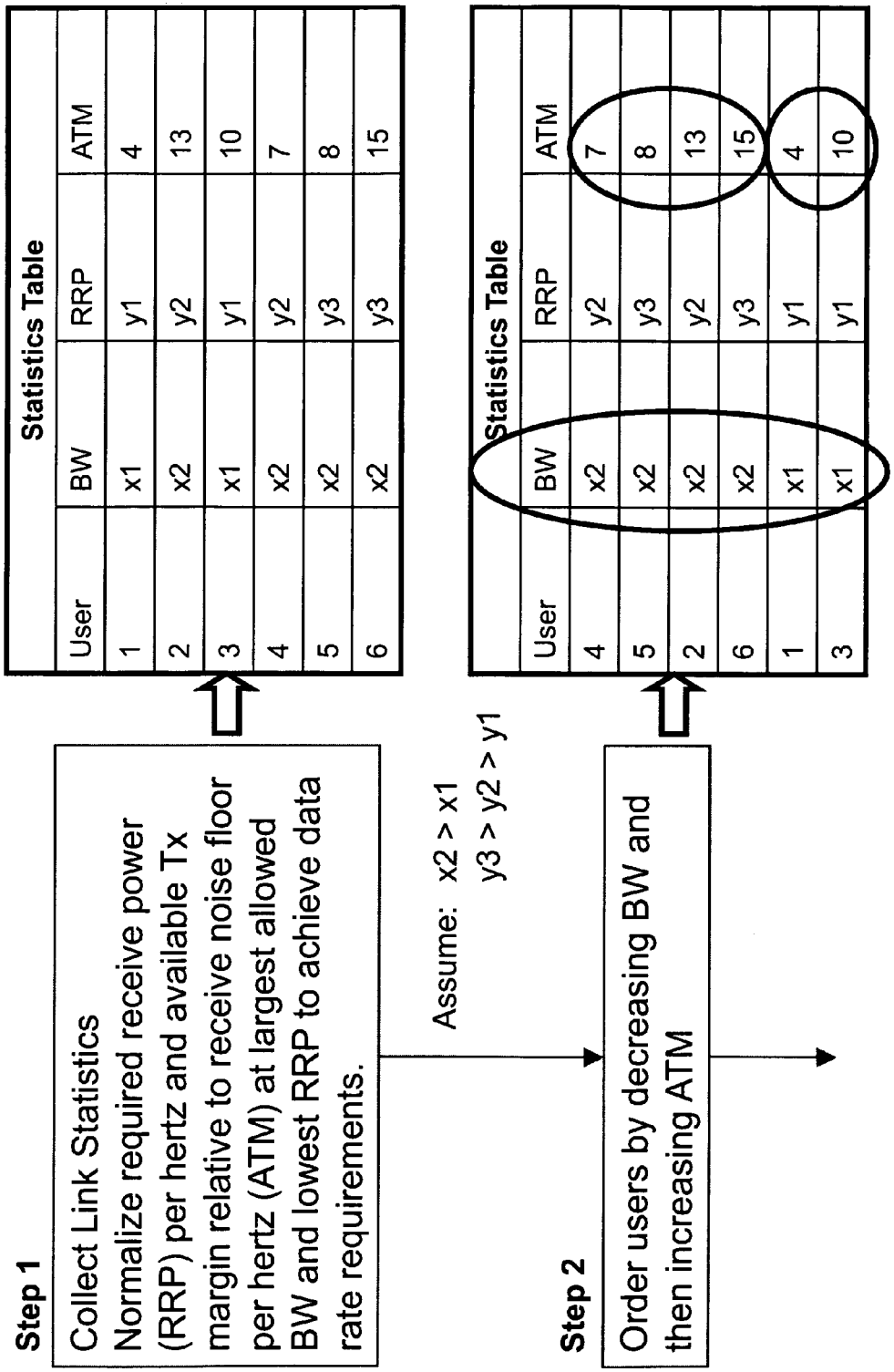
FIG. 3 illustrates initial steps performed by the inventive method including collecting link statistics for each user, and ordering the users first by decreasing bandwidth (BW) and then by increasing ATM.

FIG. 3 illustrates initial steps in one embodiment of the invention. Link metrics or statistics for a set of users (e.g., users {1 to 6} in the illustrated example) are collected in a known manner by, e.g., a centralized network planner that links with the users over established control channels. The statistics include a required receive power (RRP) per hertz for a given user=s signal, and an ATM for the user=s signal at a largest signal bandwidth (BW) and lowest RRP needed to achieve the user=s desired data rate. The statistics may be normalized and entered in a statistics table such as shown at the top of FIG. 3 for each of the users {1 to 6}. See Step 1. In the illustrated example, the signals of users {2, 4, 5, 6} each occupy a bandwidth of x2, and the signals of users {1, 3} each occupy using a bandwidth of x1, wherein x2>x1.

When allocating signal bandwidth and power for each network user, it is initially assumed that the signal modulation and error coding formats have previously been set for each user so as to require the least transmit power to sustain a link at the desired data rate. This power is usually measured as a required energy per bit/noise density (Eb/No). Typical modulation and error coding formats include, for example, quadrature phase shift keying (QPSK) modulation with a half rate turbo code, resulting in an Eb/No requirement of 2.6 dB Eb/No, and 16ary amplitude phase shift keying (16-APSK) with a half rate turbo code, requiring a 4.7 dB Eb/No. It is often possible to trade processing complexity for better Eb/No using the same coding and modulation options. Also, the Arate≅ of a code is defined as the ratio of the uncoded data (information) rate, divided by the data rate after coding.

It is convenient to translate Eb/No to RRP per hertz, by multiplying a required Eb/No by the noise floor (both in linear units rather than in dB) and the bit rate, and dividing by the required bandwidth for that bit rate and modulation/coding. To achieve the lowest RRP possible, terminals typically use the lowest modulation order and highest coding rate they can for their desired data rates.

Once the ATM and the RRP are collected for each of users {1 to 6} as shown in the table at the top of FIG. 3, the users are first ordered by signal bandwidth (BW) from greatest BW to least BW, and then ordered from smallest ATM to highest ATM for each signal bandwidth. See Step 2 and the table at the bottom of FIG. 3. As described later, starting with only those users that require greatest signal bandwidth, the users are divided into two half groups, namely, a first group including users having relatively low ATM and which are designated Alower half≅ users (rounding up for number of users in this group), and a second group of users having relatively high ATM relative to that of the lower users and which are designated Aupper half≅ users. A lower half user thus operates with a signal having lower receive power per hertz than upper user signals. This is done to facilitate reception of the most impaired users who may not have sufficient power to operate in an upper tier of a two-tier network channel plan described below. The exact margin between the ATM of users placed in the upper tier and the ATM of users placed in a lower tier of the channel plan, may depend on the type of MUD employed by the network. The inventive method assumes a SIC type of processing wherein upper tier users are decoded by treating lower tier users as noise. In other types of MUD systems, however, this constraint may not exist.

Figure 4:
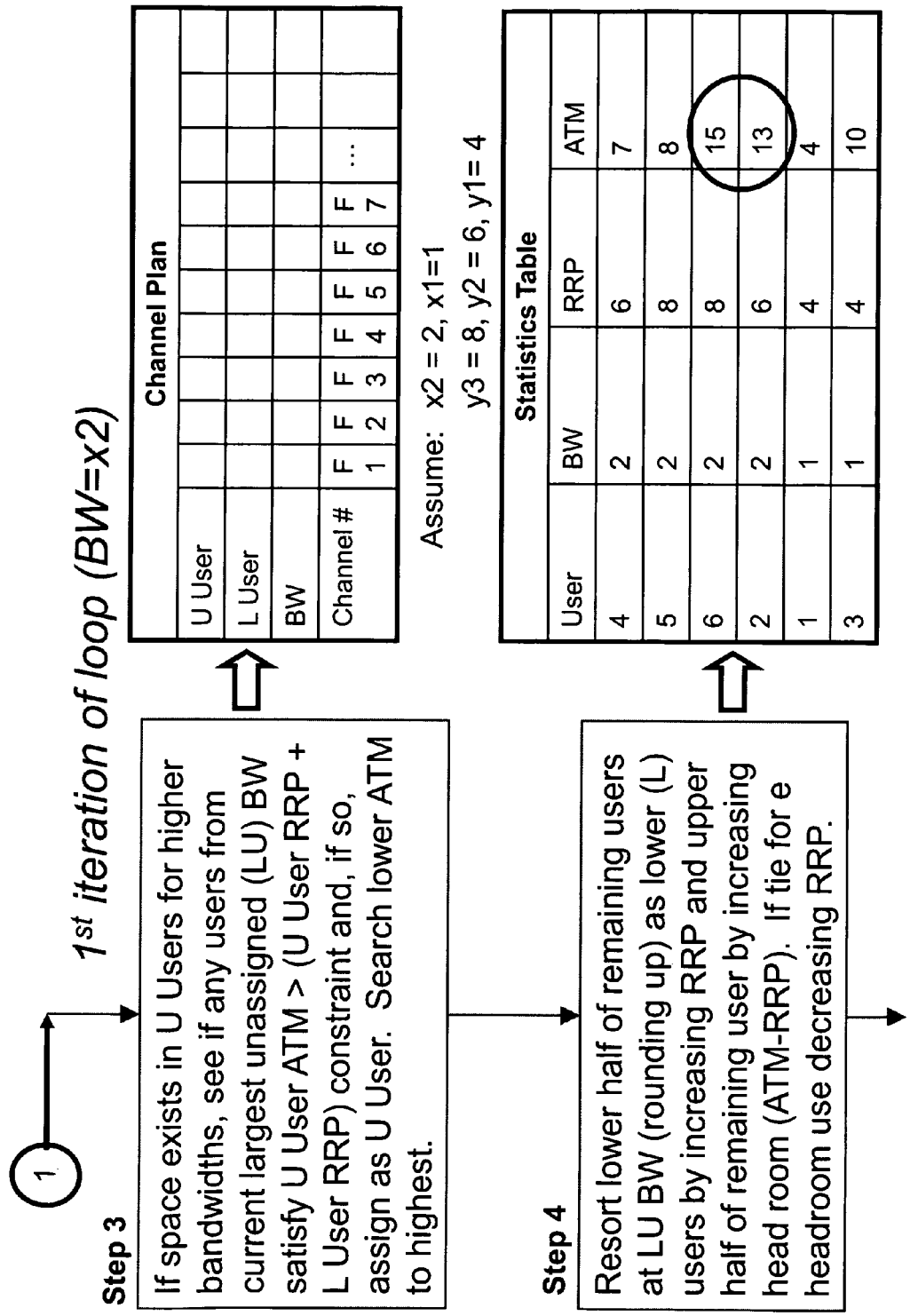
FIG. 4 illustrates additional steps of the inventive method, including defining upper user and lower user tiers in a bandwidth channel plan.

FIG. 4 shows a channel plan table that is initially unpopulated or empty. In the illustrated example, a set of, e.g., seven channels {F1 to F7} are available for assignment wherein the bandwidth of each channel corresponds, e.g., to the least bandwidth required by any one of the user signals which, in the present example, is BW=1 for users {1, 3}. See the table at the bottom of FIG. 4. As mentioned, the channel plan has a lower tier for placement of lower users (L User), and an upper tier for placement of upper users (U User). The two tiers represent the higher (upper) and the lower receive power densities of the signals from upper and lower users who are assigned network channels in the channel plan. Each user is placed in one of the two tiers and is assigned one or more channels within the one tier according to certain steps of the inventive method detailed below.

In prior systems, attempts would not be made to assign a user to a given channel in an upper tier of a similar channel plan, if bandwidth within the channel is already assigned to a user placed in the lower tier. Available space in the upper tier of the channel plan would thus remain vacant. In the inventive method, however, if a channel space exists in the upper tier above a user placed in the lower tier and whose assigned bandwidth occupies the same channel space, attempts are made to place an upper user in the channel space above the lower user so as to increase the overall spectral efficiency of the network. (See the channel plans in FIGS. 6 to 8 and related text below.) The decision whether or not to place an unassigned user in an open channel space in the upper tier above a lower user is made, for example, by comparing the potential upper user=s ATM with the sum of the RRP of the potential upper user and the RRP of the lower user. Specifically, for a bandwidth under consideration and searching from smallest ATM to highest ATM, if a given unassigned user can satisfy U User ATM>(U User RRP+L User RRP), the user is designated as a U User. See Step 3 at the top of FIG. 4.

Noise density from the noise floor and equivalent Anoise≅ density attributed to the lower user, should be converted to linear units, added together, and converted back a logarithmic scale (dB). To reduce complexity, however, the RRPs may be padded with certain additional head room (typically one dB) which results in simpler processing. That is, if the required Eb/No is 2.1, then a value of 3.1 is used when computing a user=s RRP. Alternatively, the equation ATMupper>(RRPupper+10log(10^(RRPlower/10)+1) could be used. It may also be desired to pad RRP for uncompensated propagation impairments. In any case, solutions to the equation would be found by searching from smallest ATM to highest ATM at the bandwidth under consideration.

In the table at the bottom of FIG. 4 and as described above, those users that operate with the greatest bandwidth (BW=2) and have not been assigned to a channel, e.g., users {2, 4, 5, 6}, are divided into groups of lower half users and upper half users, wherein users with lesser ATM are lower half users (rounding up for number of users in this group), and users with relatively greater ATM are upper half users. In this example, users {4, 5} are lower half users, and users {6, 2} are upper half users. The lower half users are resorted again according to increasing RRP, and the upper half users are sorted by decreasing head room (ATM minus RRP). If a tie for head exists as for users {6, 2} where ATM−RRP=7 for each, sort by decreasing RRP. See Step 4.

Figure 5:
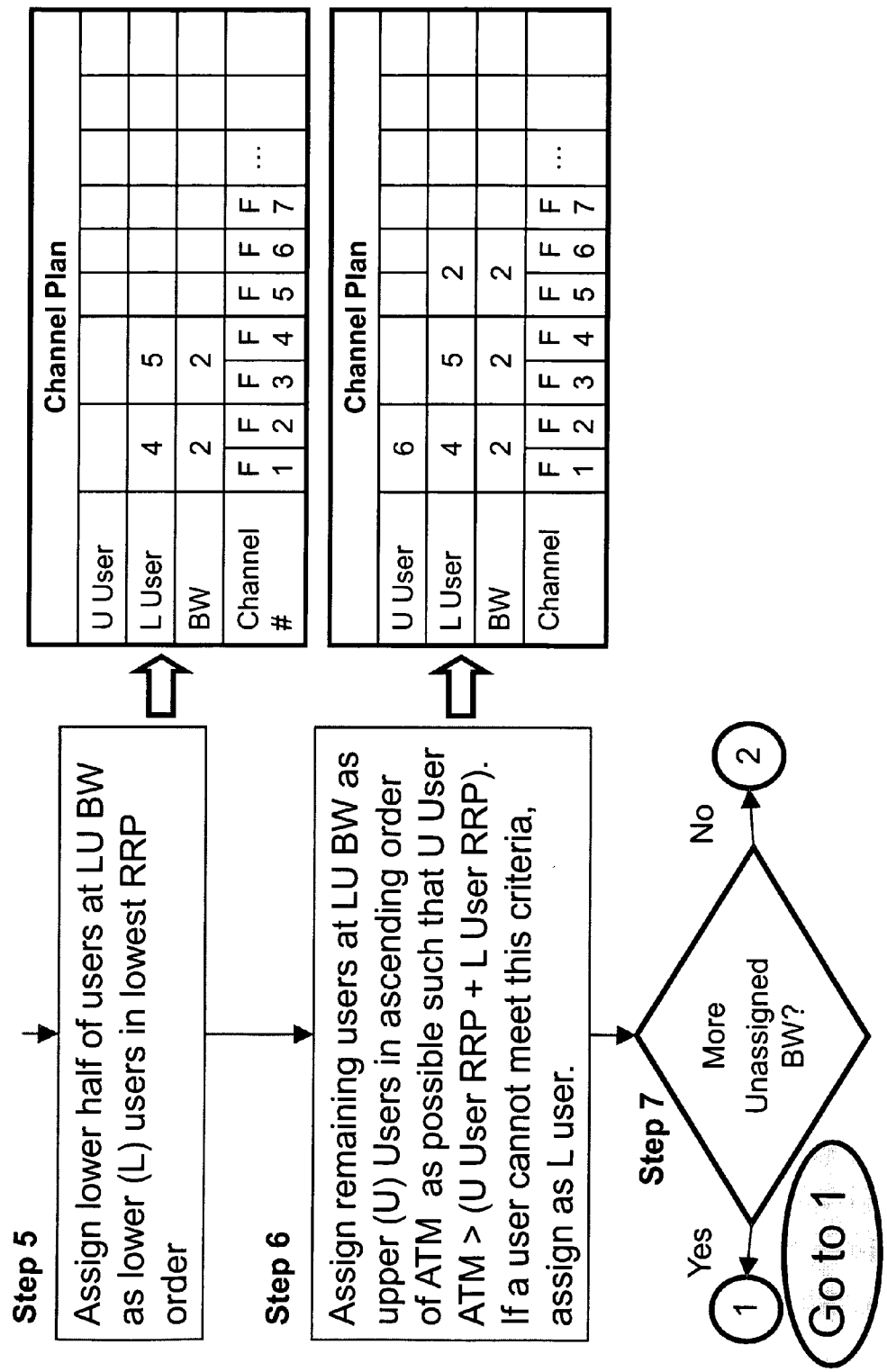
FIG. 5 illustrates additional steps of the inventive method, including assigning higher bandwidth users to corresponding channels in either the lower or the upper tiers of the channel plan.

In the channel plan at the top of FIG. 5, the lower half users {4, 5} whose signals use the greatest bandwidth (BW=2) are placed in the L User tier starting with least RRP. This step will allow other user signals to be stacked as upper users in the U User tier above assigned lower users. Since according to the inventive method the selection of upper users for stacking above lower co-channel users depends on the RRP of the lower user signals, it is convenient to order the lower users by their associated RRPs. See Step 5.

In the channel plan at the bottom of FIG. 5, the upper half users operating at the greatest bandwidth (BW=2) are placed as upper tier users if they have sufficient ATM. Because MUD processing is not expected to be applied to the upper user signals, the ATM for a designated upper user must be enough so that the RRP for the user's signal will be achieved in the presence of a lower user=s signal below the upper user in the channel plan. This implies the constraint that the required ATM for an upper user needs to be greater than the sum of the RRP for a co-channel lower user signal, and the RRP for the upper user=s signal. Upper users with the least headroom are preferably considered first since they are the most difficult to place. If an upper user does not meet the mentioned constraint, it can not be placed on the upper tier in the channel plan and is placed on the lower tier instead. The process continues until all potential upper users are considered. See Step 6.

As depicted at the bottom of FIG. 5, if there is still unassigned bandwidth, the process returns to Step 3 at the top of FIG. 4 (marker 1), and terminals operating with the next smaller signal bandwidth (BW=1) are evaluated. The steps depicted in FIGS. 3 to 5 are then repeated as illustrated in FIGS. 6 and 7 either until all terminals are placed in the channel plan, or until no more bandwidth is available to assign (see Step 7, bottom of FIG. 5) at which point the process proceeds to the step illustrated at the top of FIG. 8 (marker 2).

Figure 6:
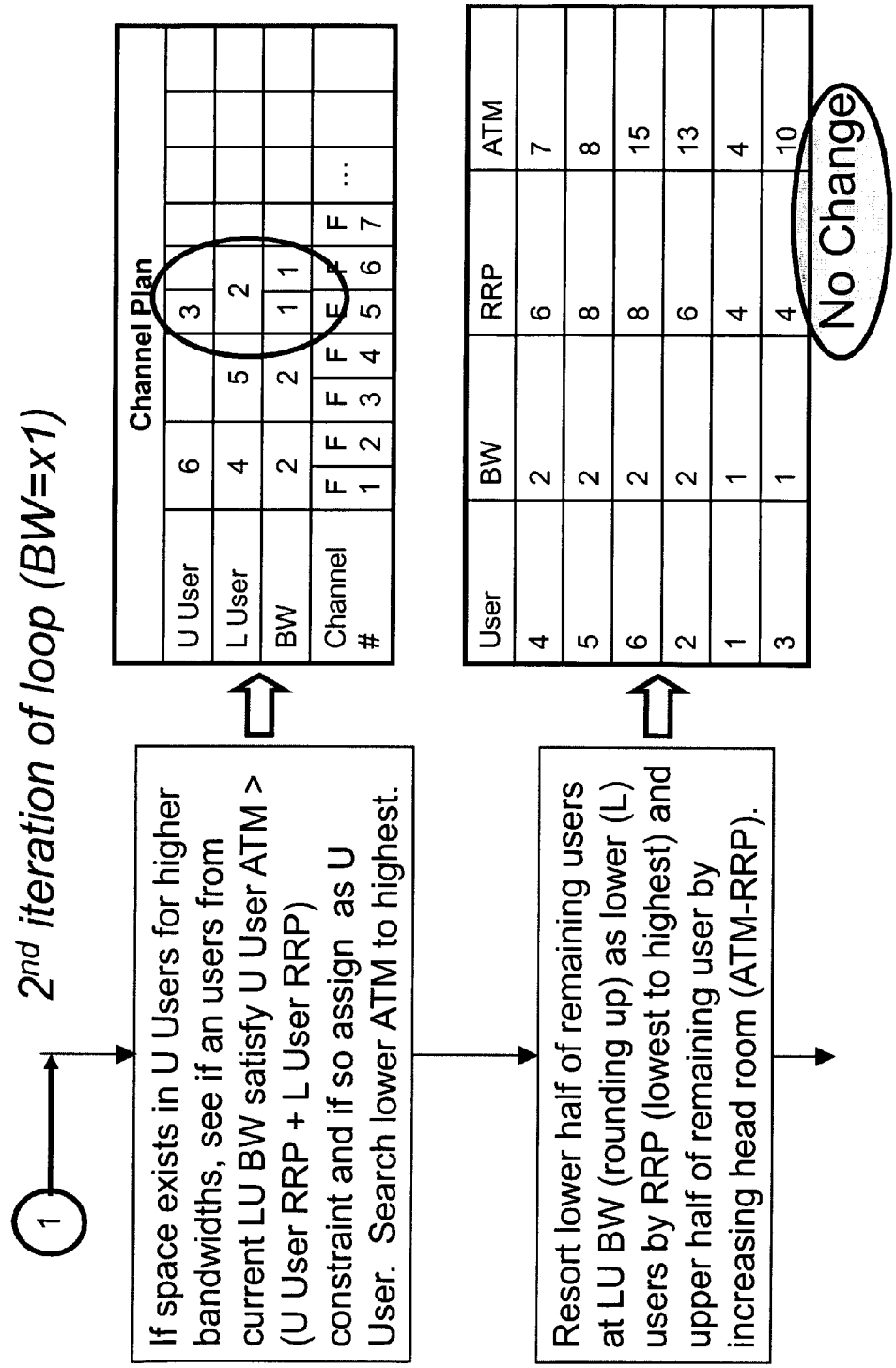
FIG. 6 illustrates additional steps of the inventive method, including assigning certain lower bandwidth users to corresponding channels in either the lower or the upper tiers of the channel plan.
Figure 7:
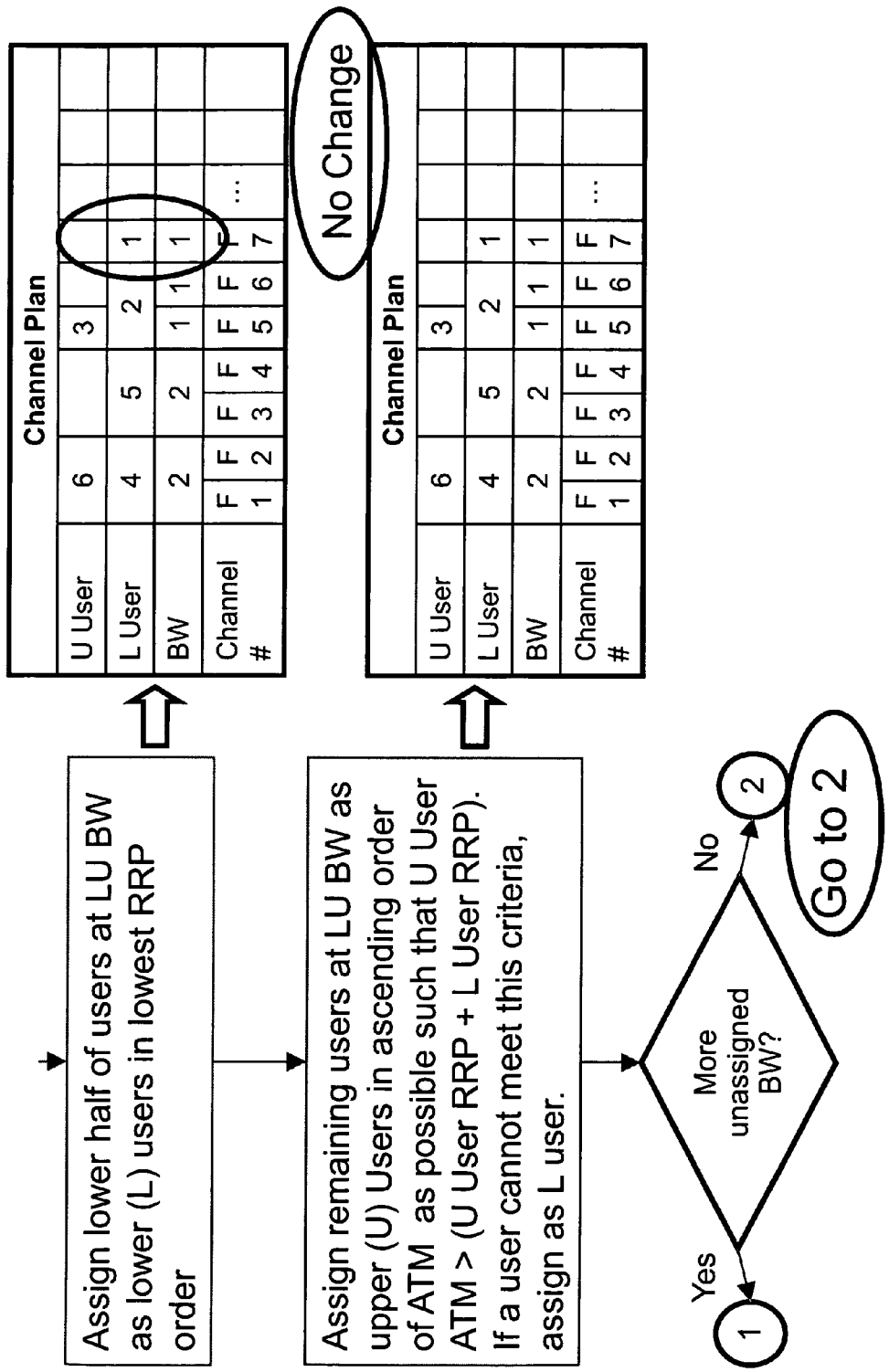
FIG. 7 illustrates additional steps of the inventive method, including assigning remaining lower bandwidth users to corresponding channels in either the lower or the upper tiers of the channel plan.

As shown at the top of FIG. 6, if unassigned bandwidth exists in the upper tier for users whose signals require a higher bandwidth (for this example, BW=2), a determination is made if the ATM of any user at the currently considered bandwidth (for this example, BW=1) satisfies the constraint ATM>(U User RRP+L User RRP) for the available space in the upper tier. If so, the user is reassigned as an upper user. Currently placed lower users are preferably evaluated from those having the smallest ATM to the highest ATM.

Accordingly, the inventive method aims to place upper users in channels that are also assigned to lower users so that the allotted network spectrum is occupied as much as possible while ensuring that each pair of upper and lower user signals occupying a common channel can be decoded using known SIC or other multi-user detection (MUD) techniques. If a channel gap or space exists in the upper tier, a determination is made whether or not to move a user currently placed in the lower tier to fill the gap in the upper tier. To ensure successful MUD, however, a wider BW lower user can not be stacked in the upper tier to overlap the bandwidth of a narrower BW user in the lower tier. Gaps in the upper tier which are located above those lower tier users whose signals occupy the greatest bandwidth and have the smallest ATM are considered first, since such lower users are highly impaired relative to the others and should not be moved to the upper tier of the channel plan. Thus, if another lower user has a BW the same or less than that of an immovable lower user, such other lower user may be relocated to the upper tier above the immovable lower user but only if the other lower user=s ATM satisfies the above mentioned requirement.

At the bottom of FIG. 6, the lower half of the remaining users at LU BW (rounding up) are resorted as lower (L) users by RRP (least to greatest), and the upper half of the remaining users are resorted by increasing head room (ATM minus RRP).

At the top of FIG. 7, the lower half users at LU BW are placed as L Users starting in order of lowest RRP and, at the bottom of the figure, the remaining users at LU BW are placed as upper users in ascending order of ATM as possible such that the user=s ATM >(U User RRP+L User RRP). If a user cannot meet this constraint, it is placed as a L User.

Figure 8:
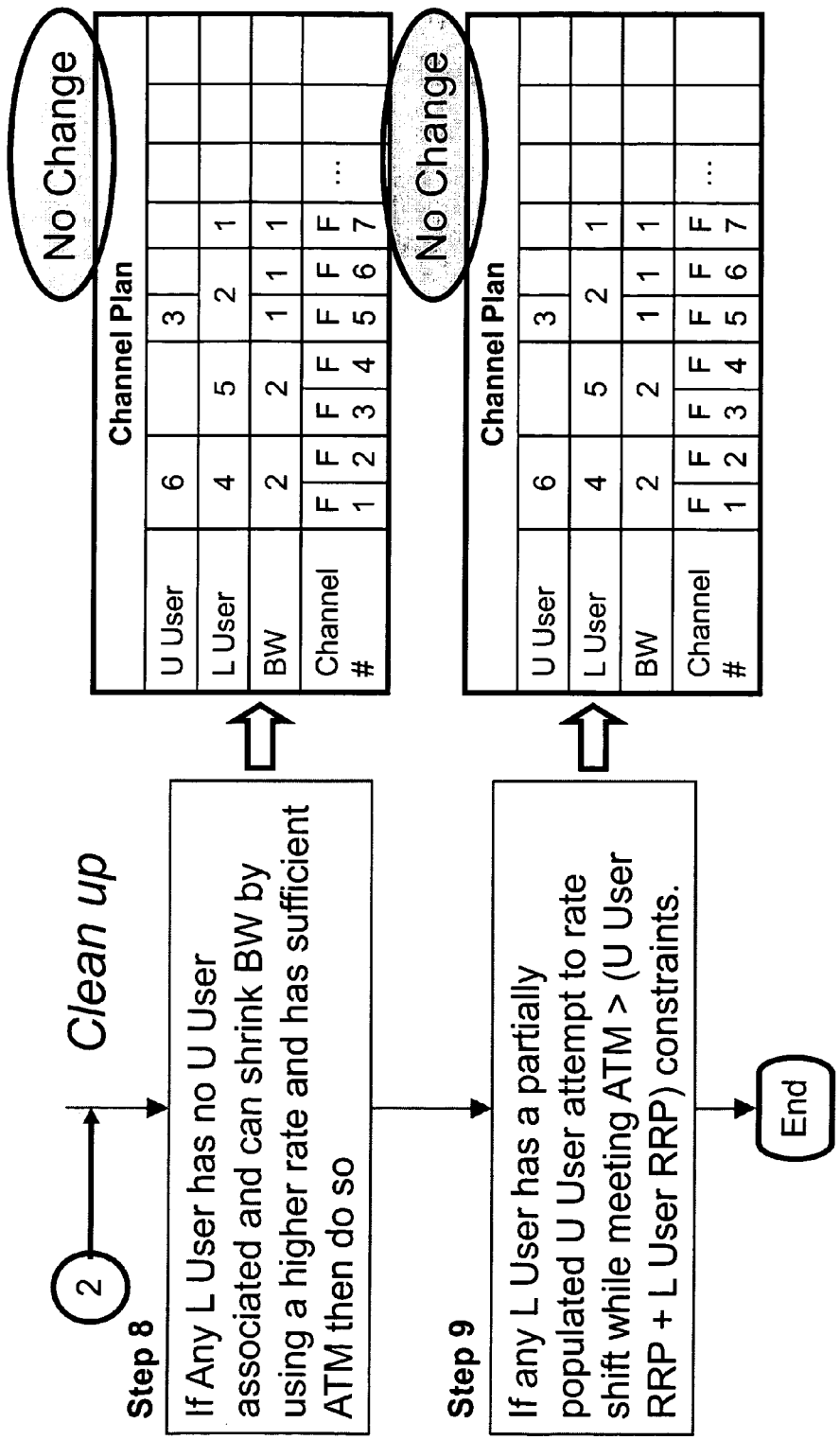
FIG. 8 illustrates final steps of the inventive method.

In Step 8 at the top of FIG. 8, users {4, 5, 2, 1} who have been placed as L Users and who have no co-channel U-Users above them in the channel plan, i.e., users {5, 1}, are each evaluated. A determination is made for each of these users if by changing to a more bandwidth efficient modulation/coding, and changing symbol rate to reduce occupied bandwidth, additional bandwidth becomes free. This will increase the RRP required for their signals, but would be acceptable if sufficient head room exists.

At the bottom of FIG. 8, each (if any) L User beneath a U User that occupies only part (e.g., half) of the total bandwidth assigned to the L User in the channel plan (e.g., L User {2} beneath U User {3} in the channel plan), is identified. It may then be considered if any such lower user can use a different modulation and coding that would allow its signal to occupy a smaller BW at the expense of a higher RRP. When considering a smaller bandwidth, the ATM must still be greater than the RRP for the lower user, and the upper users must satisfy the constraint that their ATM is greater than the sum of the new RRP for the lower user and the RRP for the upper user. Note that it is possible that the rate shifting will result in additional bandwidth becoming available. If there are any remaining terminals that have not yet been assigned bandwidth, the additional bandwidth may then be assigned to them using the smallest signal bandwidths their current ATMs will support. In the illustrated example, it is assumed that none of the L Users can use a different modulation and coding such that its signal would occupy a smaller BW at the expense of higher RRP. A final statistics table in FIG. 9 reflects no change from the statistics previously collected for the users {1 to 6} as ordered in the table in FIG. 4.

As disclosed herein, the inventive method obtains an advantage over the known channel assignment schemes by enabling relatively simple multi-user detection (MUD) processing, including successive interference cancellation (SIC), to be used while power and spectrum efficiencies in the network are increased. The signal power for each of a defined set of upper users is set so that the signal is received with sufficient strength to be successfully decoded in the presence of one or more lower user signals that occupy common bandwidth. Known SIC processes allow the lower users also to be decoded. The data coding rate and signal bandwidth initially selected for each user may also be adjusted in cases where MUD is not practical, so that a fairly efficient air interface results.

The inventive method allows bandwidth to be assigned in, for example, a frequency domain multiple access (FDMA) fashion in satellite or cellular, uplink channels that practice SIC based MUD. If network communications are further partitioned into time slots, the method can be combined with a separate scheme for assigning time slots, or the slots may themselves be treated as additional bandwidth resources and assigned in the same fashion as described herein. For example, if a network protocol defines four time slots in a given time frame, the four slots may be treated as a four-fold increase in the bandwidth available for assignment. That is, once user channel assignments are completed, the _increased_bandwidth may be divided into four portions, each corresponding to one time slot.

While the foregoing represents preferred embodiments of the invention, it will be understood by those skilled in the art that various modifications and changes may be made without departing from the spirit and scope of the invention. For example, in Step 3 in FIG. 4, head room order rather than ATM may be used when determining which user can fit in the upper (U User) tier of the channel plan, searching by lowest ATM to highest ATM. Also, rate shift may be adjusted for users in the U User and the L User tiers in the channel plan to save bandwidth. Accordingly, the invention includes all such modifications and changes as are within the bounds of the following claims.

The invention claimed is:

1. A method of assigning bandwidth or channels to users in wireless networks that incorporate multi-user detection (MUD), comprising:

collecting link statistics for a set of network users, including associating with each user (i) a bandwidth (BW) for a user signal transmitted from the user, (ii) a required receive power (RRP) for the user signal to be demodulated or decoded at a certain receiving terminal in the network, and (iii) an available transmit margin (ATM) corresponding to a difference between a maximum achievable receive power density for the user signal with respect to a noise floor at the receiving terminal;

ordering the set of network users according to their associated BW from a greatest BW to a least BW, and ordering users having the greatest BW according to their associated ATM from a smallest ATM to a highest ATM;

dividing a first set of users having the greatest BW into a group of lower half users including users having relatively low ATM, and a group of upper half users including users having relatively high ATM with respect to the ATM of the lower half users;

defining a channel plan including a number of network channels of determined bandwidth for assignment to the users, defining a lower tier in the channel plan for placement of certain lower users (L User), and defining an upper tier in the channel plan for placement of certain upper users (U User);

first assigning the group of lower half users to corresponding network channels in the lower tier of the channel plan;

second assigning a given upper half user to a given channel in the upper tier of the channel plan after placing a lower half user in the lower tier and assigning the lower half user signal bandwidth that occupies the given channel, provided the upper half user has an associated ATM that satisfies a selected one of a first relationship:

U User ATM>(U User RRP+L User RRP), or a second relationship:

U User ATM>(U User RRP+10log(10^(L User RRP/10)+1);

wherein U User RRP is the RRP associated with the upper half user, and L User RRP is the RRP associated with the lower half user;

third assigning the given upper half user to a different channel in the lower tier of the channel plan if the ATM associated with the upper half user does not satisfy the selected relationship; and repeating the dividing and subsequent steps for each, if any, remaining sets of users having successively smaller signal bandwidths with respect to the bandwidth of the first set of users, in order from most BW to least BW sets of users.

2. The method of claim 1, including sorting the group of lower half users according to their associated RRP from lowest RRP to highest RRP.

3. The method of claim 1, including performing the first assigning step by starting with lower half users having the lowest RRP.

4. The method of claim 1, including defining head room as a given user's ATM minus the user's RRP, and sorting the group of upper half users according to each user's head room from a greatest head room to a least head room.

5. The method of claim 1, including defining the channels of the network plan so that each channel corresponds to a least bandwidth occupied by any one of the network user signals.

6. The method of claim 1, including determining, after completing the repeating step, if for any given user placed in the lower tier of the channel plan and above which no co-channel user is placed in the upper tier of the plan, the bandwidth associated with the given user can be reduced thus freeing bandwidth for assignment to other users.

7. The method of claim 6, wherein the determining step includes determining if the given user can implement a more bandwidth efficient modulation or coding format, or symbol rate, to reduce the bandwidth associated with the user.

8. The method of claim 1, including determining, after completing the repeating step, if for any given user placed in the lower tier of the channel plan and above which is placed an upper user that occupies less than all the bandwidth assigned to the given user, the given user can implement a more bandwidth efficient modulation or coding format, or symbol rate, thus reducing the bandwidth associated with the user and freeing bandwidth for assignment to other users.

* * * * *